(12) United States Patent
Matsushita et al.

(10) Patent No.: US 11,788,881 B2
(45) Date of Patent: Oct. 17, 2023

(54) DETECTION SENSOR AND DETECTION DEVICE INCLUDING THE SAME

(71) Applicant: HOSIDEN CORPORATION, Yao (JP)

(72) Inventors: Tsutomu Matsushita, Kuratemachi (JP); Hiroyuki Harano, Kuratemachi (JP); Ryuji Awamura, Kuratemachi (JP); Hidenori Motonaga, Kuratemachi (JP); Kensuke Nakanishi, Kuratemachi (JP)

(73) Assignee: HOSIDEN CORPORATION, Yao (JP)

( * ) Notice: Subject to any disclaimer, the term of this patent is extended or adjusted under 35 U.S.C. 154(b) by 175 days.

(21) Appl. No.: 17/398,052

(22) Filed: Aug. 10, 2021

(65) Prior Publication Data

US 2022/0065691 A1 Mar. 3, 2022

(30) Foreign Application Priority Data

Sep. 3, 2020 (JP) .................................. 2020-148018

(51) Int. Cl.
*G01H 11/08* (2006.01)
*G01J 5/34* (2022.01)

(52) U.S. Cl.
CPC ................ *G01H 11/08* (2013.01); *G01J 5/34* (2013.01)

(58) Field of Classification Search
CPC ... G01H 11/08; G01J 5/34; G01J 5/045; G01J 5/0875; G01J 5/35; H04R 17/025; G01D 5/14

See application file for complete search history.

(56) References Cited

U.S. PATENT DOCUMENTS 4,258,260 A 3/1981 Obara et al.
2014/0354905 A1* 12/2014 Kitchens ............... G06F 3/0421
349/12

(Continued)

FOREIGN PATENT DOCUMENTS

| JP | 2016099137 A | 5/2016 |
| JP | S56-48189 U1 | 2/2019 |
| WO | 2011159003 A1 | 12/2011 |

OTHER PUBLICATIONS

Extended European Search Report for European Patent Application No. 21191264.7, dated Jan. 26, 2022 (8 pages).

*Primary Examiner* — Peter J Macchiarolo
*Assistant Examiner* — John M Royston
(74) *Attorney, Agent, or Firm* — Kilyk & Bowersox, P.L.L.C.

(57) ABSTRACT

A detection sensor according to an aspect of the invention includes a vibratable film constituted by a piezoelectric film, a case accommodating the vibratable film, and a circuit board. The vibratable film is configured to be irradiated with infrared rays and thereby generate first electric signals through a pyroelectric effect, and configured to be vibrated by sound waves and thereby generate second electric signals through a piezoelectric effect. The case includes a transmissive part. The transmissive part is configured to transmit at least infrared rays and disposed on one side in a first direction relative to the vibratable film to face the vibratable film. The first direction is a thickness direction of the vibratable film. The circuit board is fixed to the case and disposed on the other side in the first direction relative to the vibratable film. The circuit board has a sound hole to input therethrough sound waves.

14 Claims, 2 Drawing Sheets

(56) References Cited

U.S. PATENT DOCUMENTS

2015/0053859 A1\* 2/2015 Saito .................. G01J 5/34
                                                                               250/338.3
2021/0051413 A1\* 2/2021 Hui .................. H10N 30/8542

\* cited by examiner

DETECTION SENSOR AND DETECTION DEVICE INCLUDING THE SAME

CROSS-REFERENCE TO RELATED APPLICATIONS

The present application claims priority under 35 U.S.C. § 119 of Japanese Patent Application No. 2020-148018 filed on Sep. 3, 2020, the disclosure of which is expressly incorporated by reference herein in its entirety.

BACKGROUND OF THE INVENTION

Technical Field

The invention relates to detection sensors and detection devices including the same.

Background Art

A conventional detection sensor is described in Japanese Published Unexamined Utility Model Application No. S56-48189. The detection sensor includes a case having an opening, a pyroelectric film, a piezoelectric film, a first field effect transistor, and a second field effect transistor. The pyroelectric film is disposed in the case such as to face the opening. The piezoelectric film is disposed at a predetermined spacing from the pyroelectric film, and the space therebetween is airtight. The piezoelectric film has a face facing the pyroelectric film and a light-reflective electrode provided on the facing face. When the pyroelectric film is subjected to infrared rays incident through the opening and infrared rays that have passed through the pyroelectric film and then been reflected by the electrode of the piezoelectric film, a detection signal is generated and inputted into the first field effect transistor. The first field effect transistor is configured to perform impedance conversion on the inputted detection signal and output the converted detection signal as an output signal. Sound waves incident through the opening vibrate the pyroelectric film, and the vibration is transmitted to, and vibrates, the piezoelectric film to generate a detection signal to be inputted into the second field effect transistor. The second field effect transistor is configured to perform impedance conversion on the inputted detection signal and output the converted detection signal as an output signal. The conventional detection sensor is thus able to detect both infrared rays and sound waves.

SUMMARY OF INVENTION

The above conventional detection sensor receives infrared rays and sound waves through the common opening, which is wide open to take in infrared rays. Therefore, the opening easily allows dirt, dust, and/or water to enter therethrough into the conventional detection sensor.

The invention provides a detection sensor resisting entry of dirt, dust, and/or water. The invention also provides a detection device including the detection sensor.

A detection sensor according to an aspect of the invention includes a vibratable film constituted by a piezoelectric film, a case accommodating the vibratable film, and a circuit board. The vibratable film is configured to be irradiated with infrared rays and thereby generate first electric signals through a pyroelectric effect, and configured to be vibrated by sound waves and thereby generate second electric signals through a piezoelectric effect. The case includes a transmissive part. The transmissive part is configured to transmit at least infrared rays and disposed on one side in a first direction relative to the vibratable film to face the vibratable film. The first direction is a thickness direction of the vibratable film. The circuit board is fixed to the case and disposed on the other side in the first direction relative to the vibratable film. The circuit board has a sound hole to input therethrough sound waves.

The transmissive part may be provided not in the case but in the circuit board and disposed on the other side in the first direction relative to the vibratable film. In this case, the sound hole may be provided not in the circuit board but in a top plate of the case.

The detection sensor of either of the above aspects resistant to entry of dirt, dust, and/or water for the following reasons. The detection sensor is configured such that the vibratable film is irradiated with infrared rays passing through the transmissive part. As such, the detection sensor has no opening for taking in infrared rays into the detection sensor. The circuit board or the case is provided with the sound hole, but this hole is small in size. Therefore, dirt, dust, and/or water is unlikely to enter the detection sensor through the sound hole.

In a cross section along a second direction substantially orthogonal to the first direction, the sound hole may have dimensions that are smaller than the dimensions of the transmissive part.

The transmissive part may be constituted by an optical filter configured to transmit infrared rays in a predetermined wavelength band.

The vibratable film may include a film body and first and second electrodes. The film body may have a first face on the one side in the first direction and a second face on the other side in the first direction. The first electrode may be provided on the first face of the film body. The second electrode may be provided on the second face of the film body.

The detection sensor of any of the above aspects may further include a field effect transistor. The field effect transistor may be configured to perform impedance conversion on the first electric signals and/or the second electric signals received from the vibratable film and output the converted first electric signals and/or the converted second electric signals as output signals.

A detection device according to an aspect of the invention may include the detection sensor according to one of the above aspects, a low-pass filter, and a high-pass filter. The low-pass filter may be configured to receive the output signals from the field effect transistor, to pass signals within a frequency band obtained by impedance converting the first electric signals out of the received output signals, and to attenuate signals in a frequency band higher than the frequency band of the signals capable of passing through the low-pass filter. The high-pass filter may be configured to pass signals in a frequency band out of the output signals, the frequency band being higher than the frequency band of the signals capable of passing through the low-pass filter, and to attenuate signals in a frequency band lower than the frequency band of the signals capable of passing through the high-pass filter.

The detection device may further include a controller. The controller may be configured to receive the signals that have passed through the low-pass filter and the signals that have passed through the high-pass filter, and to determine whether or not the controller has received signals only from the low-pass filter.

The controller may be further configured such that if the controller determines that the controller has received signals only from the low-pass filter, then the controller performs signal processing on the output signals from the field effect transistor, or alternatively on the signals that have passed through the low-pass filter and the signals that have passed through the high-pass filter.

Figure 1:
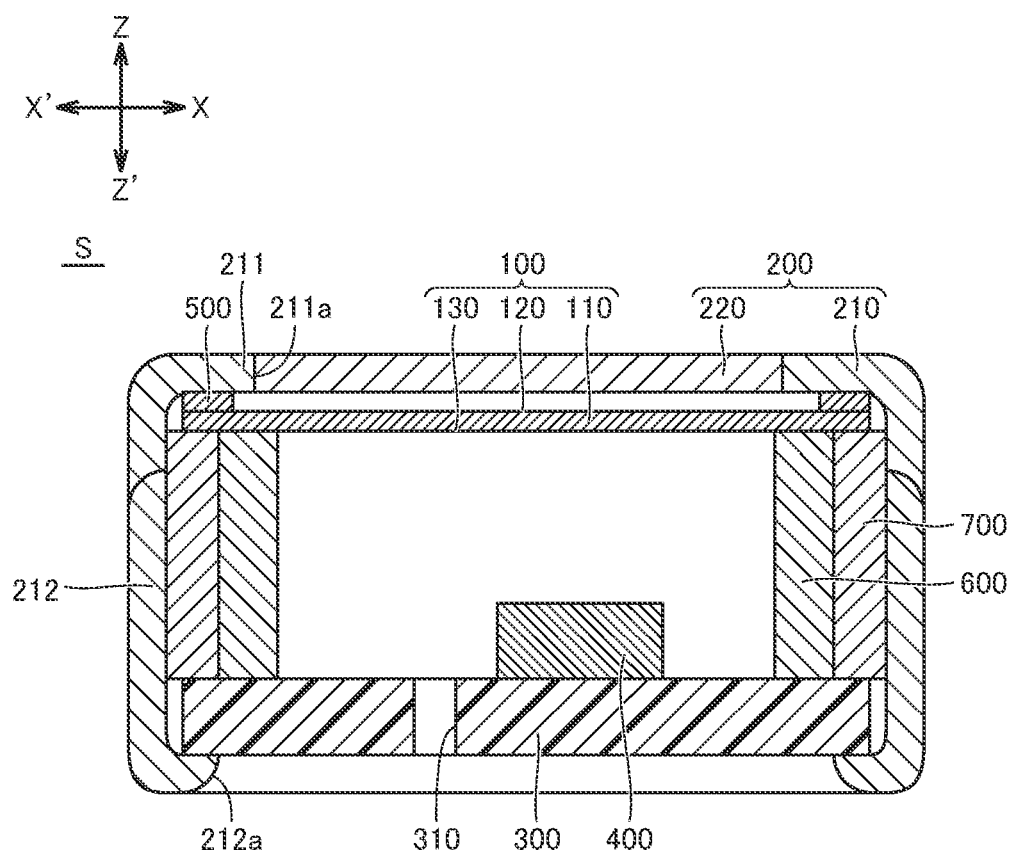
FIG. 1 is a schematic cross-sectional view of a detection sensor according to a first embodiment of the invention.

In the brief description of the drawings above and the description of embodiments which follows, relative spatial terms such as "upper", "lower", "top", "bottom", "left", "right", "front", "rear", etc., are used for the convenience of the skilled reader and refer to the orientation of the detection sensors, detection devices, and their constituent parts as depicted in the drawings. No limitation is intended by use of these terms, either in use of the invention, during its manufacture, shipment, custody, or sale, or during assembly of its constituent parts or when incorporated into or combined with other apparatus.

DESCRIPTION OF EMBODIMENTS

A first embodiment of the invention and design modifications thereof will now be described. It should be noted that constituents of the embodiments and the modifications thereof to be described may be combined in any possible manner. Materials, shapes, dimensions, numbers, arrangements, etc. of the constituents of the various aspects of the embodiments and the modifications thereof will be discussed below as examples only and may be modified as long as they achieve similar functions.

First Embodiment

Hereinafter described is a detection sensor S according to a plurality of embodiments, including a first embodiment, of the invention with reference to FIG. 1. FIG. 1 shows a detection sensor S according to the first embodiment. FIG. 1 shows a Z-Z' direction (first direction) and an X-X' direction (second direction). The Z-Z' direction includes a Z direction (one side in the first direction) and a Z' direction (the other side in the first direction). The X-X' direction is substantially orthogonal to the Z-Z' direction and includes an X direction and an X' direction.

The detection sensor S includes a vibratable film 100. The vibratable film 100 is constituted by a piezoelectric film exhibiting pyroelectricity. The vibratable film 100 includes a film body 110, a first electrode 120, and a second electrode 130. The film body 110 may be a synthetic resin film having a dimension in the Z-Z' direction (thickness dimension) of about 0.015 mm to about 0.030 mm, for example. The film body 110 has a first face on the Z-direction side and a second face on the Z'-direction side. The first electrode 120 is provided on the first face of the film body 110. The second electrode 130 is provided on the second face of the film body 110. The Z-Z' direction is the thickness direction of the vibratable film 100.

The vibratable film 100 is configured to be irradiated with infrared rays and thereby generate first electric signals through a pyroelectric effect. Specifically, the vibratable film 100 is spontaneously polarized when not irradiated with infrared rays. When the vibratable film 100 is irradiated with infrared rays resulting in a change in temperature of the vibratable film 100, the spontaneous polarization of the vibratable film 100 accordingly changes to cause a change in voltage of the vibratable film 100, i.e., to generate the first electric signals.

The vibratable film 100 is further configured to be vibrated by sound waves and thereby generate second electric signals through a piezoelectric effect. Specifically, the vibratable film 100 is configured to be deformed by vibration and accordingly cause changes in voltage, i.e., generate the second electric signals.

The detection sensor S further includes a case 200. The case 200 accommodates the vibratable film 100. The case 200 includes a case body 210 and a transmissive part 220. The case body 210 includes a top plate 211 and a tubular portion 212. The top plate 211 is disposed on the Z-direction side relative to the vibratable film 100. The top plate 211 has an opening 211a passing through the top plate 211 in the Z-Z' direction. The tubular portion 212 extends in the Z' direction from the perimeter portion of the top plate 211. The tubular portion 212 has an end portion 212a on the Z' direction side. The end portion 212a may be bent generally in a L-shape or may extend in the Z-Z' direction.

The transmissive part 220 is fitted in the opening 211a. Accordingly, in a cross section along the X-X' direction, the transmissive part 220 has an outer shape that is substantially the same as the shape of the opening 211a, and has outer dimensions that are the same as, or slightly larger than, the dimensions of the opening 211a. The transmissive part 220 is disposed on the Z-direction side relative to the vibratable film 100 to face the vibratable film 100. The transmissive part 220 is configured to transmit at least infrared rays. For example, the transmissive part 220 may be constituted by an optical filter configured to transmit infrared rays in a predetermined wavelength band only (for example, 1.2 μm to 1.4 μm (1200 nm to 1400 nm)), an optical filter configured to transmit infrared rays in a wavelength band of 780 nm to 1 mm, or an optical filter configured to transmit infrared rays and light in a wavelength band or bands near the infrared band (for example, visible light of a wavelength band from about 400 nm to 780 nm and/or microwaves having a wavelength band from 1 mm to 1m). The optical filter may be constituted by an optical lens made of silicon, for example, but is not limited thereto. In place of the optical filter, the transmissive part 220 may be composed of a transparent or translucent material, such as synthetic resin or glass, configured to transmit at least infrared rays. Infrared rays having transmitted through the transmissive part 220 of any of the above aspects are projected onto the vibratable film 100.

The detection sensor S further includes a circuit board 300. The circuit board 300 is fixed to the case 200. For example, the circuit board 300 may be fixed to the end portion 212a bent generally in a L-shape of the tubular portion 212 of the case 200 (see FIG. 1); the end portion 212a extending in the Z-Z' direction of the tubular portion 212 of the case 200 may be securely received in, and thereby fixed to, an engagement hole of the circuit board 300 (not shown); or the end portion 212a extending in the Z-Z' direction of the tubular portion 212 of the case 200 may be bonded to, and thereby fixed to, the circuit board 300 with a conductive adhesive or the like (not shown). The circuit board 300 is disposed on the Z'-direction side relative to, and in spaced relation to, the vibratable film 100.

The circuit board 300 includes a sound hole 310. The sound hole 310 extends through the circuit board 300 in the Z-Z' direction. In a cross section along the X-X' direction, the sound hole 310 has a shape that is the same as, or different from, the outer shape of the transmissive part 220. In a cross section along the X-X' direction, the sound hole 310 may have dimensions that are smaller than the outer dimensions of the transmissive part 220, but is not limited thereto. For example, the sound hole 310 may have a dimension (a diameter) between 0.6 mm and 0.8 mm in a cross section along the X-X' direction. The sound hole 310 may face the vibratable film 100, or there may be another member interposed between the sound hole 310 and the vibratable film 100. Sound waves inputted through the sound hole 310 are to vibrate the vibratable film 100. A waterproof and/or dustproof sheet (not shown) may be fixed to the circuit board 300 from the Z'-direction side to close the sound hole 310 from the Z'-direction side. This sheet can be omitted.

The detection sensor S may further include a field effect transistor 400 (FET 400). The FET 400 is electrically connected to the vibratable film 100. The FET 400 may be mounted on the circuit board 300, or may be mounted on another circuit board (not shown) electrically connected to the circuit board 300. The FET 400 is configured to receive the first signals and/or the second electric signals from the vibratable film 100 and perform impedance conversion on the first electric signals and/or the second electric signals to output the converted first electric signals and/or the converted second electric signals as output signals.

The detection sensor S may further include a conductive ring 500 and a gate ring 600 of a tubular shape. The conductive ring 500 is interposed between the perimeter portion of the vibratable film 100 and the top plate 211 of the case 200, and is in contact with the first electrode 120 of the vibratable film 100. In this case, the case body 210 of the case 200 is made of an electrically conductive material. The gate ring 600 is electrically conductive, interposed between the perimeter portion of the vibratable film 100 and the circuit board 300, and in contact with the second electrode 130 of the vibratable film 100. The first electrode 120 of the vibratable film 100 is electrically connected to the FET 400 via the conductive ring 500, the case body 210, and the circuit board 300, while the second electrode 130 of the vibratable film 100 is electrically connected to the FET 400 via the gate ring 600 and the circuit board 300. The FET 400 is thus electrically connected to the vibratable film 100.

The detection sensor S may further include a holder 700 of a tubular shape. The holder 700 is electrically insulative. The holder 700 is disposed between the gate ring 600 and the tubular portion 212 of the case body 210. Accordingly, in a cross section along the X-X' direction, the holder 700 has an inner shape that is the same as the outer shape of the gate ring 600, and has inner dimensions that are substantially the same as, or slightly larger than, the outer dimensions of the gate ring 600. Also, in a cross section along the X-X' direction, the holder 700 has an outer shape that is the same as the inner shape of the tubular portion 212 of the case body 210, and has outer dimensions that are substantially the same as, or slightly smaller than, the inner dimensions of the tubular portion 212 of the case body 210. The holder 700 may or may not be in contact with a portion of the vibratable film 100 that is outside the portion of the vibratable film 100 that is contacted by the gate ring 600. Also, the holder 700 may or may not be in contact with the circuit board 300.

Figure 2:
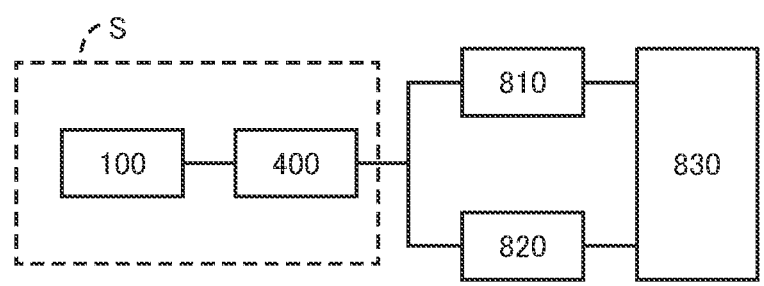
FIG. 2 is a block diagram of a detection device according to the first embodiment of the invention.

Hereinafter described is a detection device D according to a plurality of embodiments, including a first embodiment, of the invention with reference to FIG. 2. FIG. 2 shows the detection device D according to the first embodiment.

The detection device D may include the detection sensor S according to one of the above aspects, a low-pass filter 810, and a high-pass filter 820.

The low-pass filter 810 may be provided on a circuit board (not shown) electrically connected to the circuit board 300, or on the circuit board 300. The low-pass filter 810 is electrically connected to the FET 400 via the circuit board 300 and configured to receive output signals from the FET 400. The low-pass filter 810 is configured to pass signals within a frequency band (first frequency band), which signals within the first frequency band are obtained by impedance converting the first electric signals, out of the received output signals. The low-pass filter 810 is also configured to attenuate signals in a frequency band higher than the first frequency band (the frequency band signals of which can pass through the low-pass filter 810). Specifically, signals obtained by impedance converting the first electric signals falls within a frequency band between 0.35 Hz and 5.0 Hz, and accordingly the low-pass filter 810 is configured to pass signals in a frequency band of 5.0 Hz and lower, out of the received output signals, and to attenuate signals in a frequency band of higher than 5.0 Hz (not including 5.0 Hz).

The high-pass filter 820 may be provided on a circuit board (not shown) electrically connected to the circuit board 300, or on the circuit board 300. The high-pass filter 820 is electrically connected to the FET 400 via the circuit board 300 and configured to receive output signals from the FET 400. The high-pass filter 820 is configured to pass signals in a frequency band (second frequency band) higher than the first frequency band (the frequency band signals of which can pass through the low-pass filter 810), out of the received output signals. The high-pass filter 820 is also configured to attenuate signals in a frequency band lower than the second frequency band (the frequency band signals of which can pass through the high-pass filter 820). Specifically, the high-pass filter 820 is configured to pass signals in a frequency band higher than 10.0 Hz (not including 10.0 Hz) and attenuate signals in a frequency band of 10.0 Hz and lower.

The detection device D may further include a controller 830. The controller 830 may be provided on a circuit board (not shown) electrically connected to the circuit board 300, or on the circuit board 300. The controller 830 is electrically connected to the low-pass filter 810 and the high-pass filter 820, and configured to receive signals that have passed through the low-pass filter 810 and signals that have passed through the high-pass filter 820. The controller 830 may be, but is not required to be, electrically connected to the FET 400 to receive output signals from the FET 400.

The controller 830 may be configured to determine whether or not the controller 830 has received signals only from the low-pass filter 810. Hereinafter described is a non-limiting example configuration of the controller 830. The controller 830 determines whether or not it has received signals from the low-pass filter 810 (first determination). If the controller 830 determines that it has received signals from the low-pass filter 810, the controller 830 counts for a predetermined period, using a timer circuit in the controller 830 or a software timer on an internal memory, and determines whether or not it has received signals from the high-pass filter 820 within the predetermined period (second determination). If the controller 830 determines that it has received signals from the high-pass filter 820 within the predetermined period (that is, if the controller 830 determines that it has received signals not only from the low-pass filter 810), the controller 830 returns to the processing of the first determination. On the other hand, if the controller 830 determines that it has not received any signals from the high-pass filter 820 within the predetermined period, then the controller 830 determines that it has received signals only from the low-pass filter 810. In this example configuration, the controller 830 is configured to make the second determination within the predetermined period after making the first determination. Instead, the controller 830 may be configured to make the first determination within the predetermined period after making the second determination.

If the controller 830 determines that it has received signals only from the low-pass filter 810, this means that the controller 830 has received signals obtained by impedance converting the first electric signals from the vibratable film 100 by irradiating the vibratable film 100 with infrared rays. Thus the controller 830 determines that infrared rays have fallen on the vibratable film 100 and thereby is able to detect the infrared rays. If the controller 830 determines that it has received signals not only from the low-pass filter 810, this means that the controller 830 has received signals obtained by impedance converting the second electric signals from the vibratable film 100 vibrated by sound waves. Thus the controller 830 determines that the vibratable film 100 is vibrated by the sound waves and thereby is able to detect the sound waves.

The controller 830 may be further configured such that if the controller 830 determines that it has received signals only from the low-pass filter 810, the controller 830 performs signal processing, such as voice recognition processing, on signals received from the FET 400, or alternatively on signals received from the low-pass filter 810 and signals received from the high-pass filter 820. The controller 830 may be configured to amplify signals received from the FET 400, or alternatively signals received from the low-pass filter 810 and signals received from the high-pass filter 820, and perform the above-described signal processing on the amplified signals.

The controller 830 may be configured to return to the first determination on the basis of externally provided instruction information. Alternatively, the controller 830 may be configured such that if the controller 830 determines that it has received signals only from the low-pass filter 810, the controller 830 counts for a predetermined period, using a timer circuit in the controller 830 or a software timer on an internal memory, and perform signal processing within a predetermined period in one of the above manners. In this case, the controller 830 may be configured to return to the processing of the first determination after the predetermined period has elapsed. The controller 830 may not include the configuration for performing the above signal processing and may be configured to repeat the processing of the first determination and the processing of the second determination in this order or in the reverse order.

The detection sensor S and the detection device D described above provide at least the following technical features and effects. Technical Feature and Effect (1): the detection sensor S is resistant to entry of dirt, dust, and/or water through the sound hole for the following reasons. The detection sensor S and the detection device D are configured to allow infrared rays to enter the case 200 through the transmissive part 220 of the case 200. As such, the case 200 has no opening for taking in infrared rays into the detection sensor S. The circuit board 300 is provided with the sound hole 310, but this hole is small in size. Therefore, the detection sensor S is resistant to entry of dirt, dust, and/or water into through the sound hole 310. Where the sound hole 310 is closed with the waterproof and/or dustproof sheet, the detection sensor S is further resistant to entry of dirt, dust, and/or water through the sound hole 310.

Technical Feature and Effect (2): The detection sensor S and the detection device D has improved versatility for the following reasons. Since the detection sensor S is dustproof and/or waterproof as described above, the detection sensor S can be installed in a place with a lot of dust and dirt and/or a place where water may adhere. Also, human bodies emit infrared rays having a peak wavelength of about 10 μm (1000 nm). Since the emitted infrared rays are transmitted through the transmissive part 220 of the detection sensor S of the detection device D and are projected onto the vibratable film 100, the detection device D may detect approach of a human body (including placing a hand of a human over the detection device D) in a manner as described above. The detection device D may be incorporated in a vending machine or a ticket machine, for example. The detection device D of this aspect may be configured to perform voice recognition processing after detecting approach of a human body by detecting irradiated infrared rays on the vibratable film 100 as described above. In this case, after detecting an approach of a human, the vending machine or the ticket machine may allow the human to purchase a product by his or her voice without touching the vending machine or the ticket machine with the human body. The detection device D may be incorporated in a fire detector, for example. The detection device D of this aspect may be configured to perform voice recognition processing after detecting a temperature change caused by a fire or other causes, by detecting irradiated infrared rays on the vibratable film 100 as described above. In this case, after detecting a temperature change caused by a fire or other causes, the fire detector may transmit processed voice data through the Internet or other lines. The detection device D may be incorporated in a security camera or other alarm devices. The detection device D of this aspect may be configured to perform voice recognition processing after detecting approach of a human body by detecting irradiated infrared rays on the vibratable film 100 as described above. In this case, after detecting approach of a human, the alarm device may record processed voice data (voices, sounds, etc.) and/or transmit the processed voice data through the Internet or other lines.

Technical Feature and Effect (3): The detection sensor S has a reduced number of components for the following reasons. Since the vibratable film 100 is formed using a piezoelectric film exhibiting pyroelectricity, the detection sensor S does not require both a piezoelectric film and a pyroelectric film like the detection sensor of the conventional example discussed above. In addition, the single FET 400 is capable of performing impedance conversion on both the first electric signals and second electric signals from the vibratable film 100, the detection sensor S does not require two FETs like the detection sensor of the conventional example discussed above.

It should be appreciated that the detection sensor and the detection device described above are not limited to the embodiments described above, but may be modified as appropriate within the scope of the claims. Some example modifications are described below.

Figure 3:
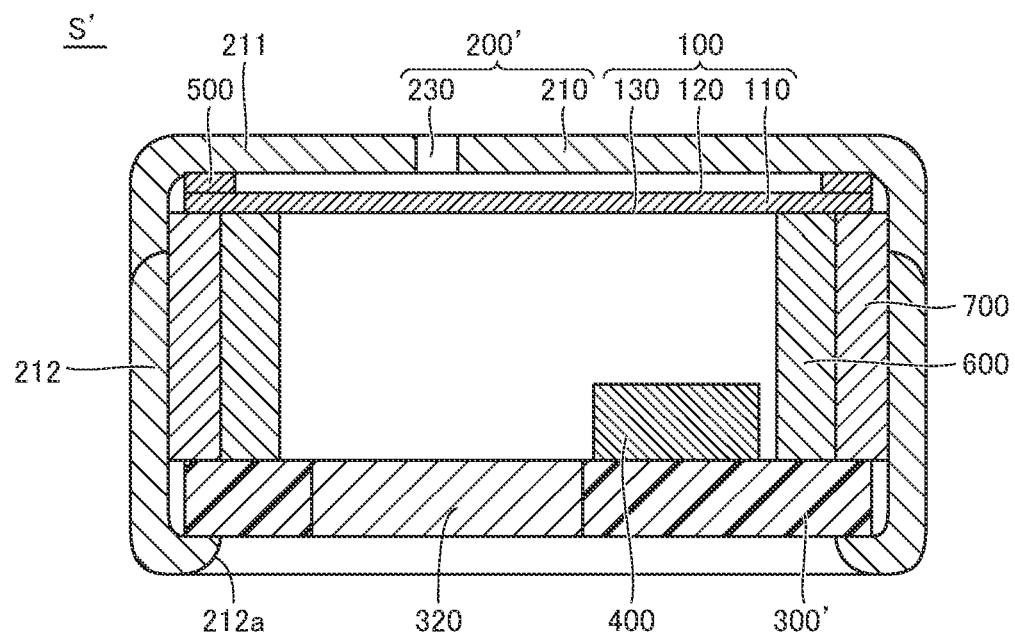
FIG. 3 is a schematic cross-sectional view of a variant of the detection sensor.

As described above, the detection sensor S is structured such that the transmissive part 220 is provided in the case 200, and the sound hole 310 is provided in the circuit board 300. However, the detection sensor of the invention may be structured as in a detection sensor S' shown in FIG. 3. More particularly, a transmissive part 320 is provided in a circuit board 300', and a sound hole 230 is provided in a top plate 211 of a case 200'. The detection sensor S' has substantially the same configuration as the detection sensor S except the following points. The transmissive part 320 is disposed on the Z' direction side relative to, and in spaced relation to, the vibratable film 100 to face the vibratable film 100. The detection device D may include the detection sensor S' in place of the detection sensor S. The detection sensors S and S' of any of the above aspects are not limited to those provided in the detection device D, but may be provided in other detection devices or electronic devices for use.

REFERENCE SIGNS LIST

D: detection device
S, S': detection sensor
100: vibratable film
110: film body; 120: first electrode; 130: second electrode
200,200': case
210: case body; 211: top plate; 211a: opening; 212: tubular portion; 212a: end portion
220: transmissive part
230: sound hole
300: circuit board
310: sound hole
320: transmissive part
400: field effect transistor (FET)
500: conductive ring
600: gate ring
700: holder
810: low-pass filter
820: high-pass filter
830: controller

What is claimed is:

1. A detection sensor comprising:
    a vibratable film constituted by a piezoelectric film, the vibratable film being configured to be irradiated with infrared rays and thereby generate first electric signals through a pyroelectric effect, and configured to be vibrated by sound waves and thereby generate second electric signals through a piezoelectric effect;
    a case accommodating the vibratable film and including a transmissive part, the transmissive part being configured to transmit at least infrared rays and disposed on one side in a first direction relative to the vibratable film to face the vibratable film, the first direction being a thickness direction of the vibratable film; and
    a circuit board being fixed to the case and disposed on the other side in the first direction relative to the vibratable film, the circuit board having a sound hole to input therethrough sound waves, wherein
    in a cross section along a second direction substantially orthogonal to the first direction, the sound hole has dimensions that are smaller than the dimensions of the transmissive part.

2. The detection sensor according to claim 1, wherein the transmissive part is constituted by an optical filter configured to transmit infrared rays in a predetermined wavelength band.

3. The detection sensor according to claim 1, wherein the vibratable film includes:
    a film body having a first face on the one side in the first direction and a second face on the other side in the first direction;
    a first electrode on the first face of the film body; and
    a second electrode on the second face of the film body.

4. The detection sensor according to claim 1, further comprising a field effect transistor configured to perform impedance conversion on the first electric signals and/or the second electric signals received from the vibratable film and output the converted first electric signals and/or the converted second electric signals as output signals.

5. A detection device comprising:
    the detection sensor according to claim 4;
    a low-pass filter configured to receive the output signals from the field effect transistor, to pass signals within a frequency band obtained by impedance converting the first electric signals out of the received output signals, and to attenuate signals in a frequency band higher than the frequency band of the signals capable of passing through the low-pass filter;
    a high-pass filter configured to pass signals in a frequency band out of the output signals, the frequency band being higher than the frequency band of the signals capable of passing through the low-pass filter, and to attenuate signals in a frequency band lower than the frequency band of the signals capable of passing through the high-pass filter; and
    a controller configured to receive the signals that have passed through the low-pass filter and to receive the signals that have passed through the high-pass filter, individually, and to determine whether or not the controller has received signals only from the low-pass filter.

6. The detection device according to claim 5, wherein the controller is further configured such that if the controller determines that the controller has received signals only from the low-pass filter, then the controller performs signal processing on the output signals from the field effect transistor.

7. The detection device according to claim 5, wherein the controller is further configured such that if the controller determines that the controller has received signals only from the low-pass filter, then the controller performs signal processing on the signals that have passed through the low-pass filter and the signals that have passed through the high-pass filter.

8. A detection sensor comprising:
    a vibratable film constituted by a piezoelectric film, the vibratable film being configured to be irradiated with infrared rays and thereby generate first electric signals through a pyroelectric effect, and configured to be vibrated by sound waves and thereby generate second electric signals through a piezoelectric effect;
    a case accommodating the vibratable film and including:
        a top plate disposed on one side in a first direction relative to the vibratable film, the first direction being a thickness direction of the vibratable film, and
        a sound hole in the top plate to input sound waves through the sound hole; and
    a circuit board being fixed to the case, being disposed on the other side in the first direction relative to the vibratable film, and including a transmissive part, the transmissive part being configured to transmit at least infrared rays and disposed on the other side in the first direction relative to the vibratable film to face the vibratable film, wherein
    in a cross section along a second direction substantially orthogonal to the first direction, the sound hole has dimensions that are smaller than the dimensions of the transmissive part.

9. The detection sensor according to claim 8, wherein the transmissive part is constituted by an optical filter configured to transmit infrared rays in a predetermined wavelength band.

10. The detection sensor according to claim 8, wherein the vibratable film includes:

a film body having a first face on the one side in the first direction and a second face on the other side in the first direction;

a first electrode on the first face of the film body; and a second electrode on the second face of the film body.

11. The detection sensor according to claim 8, further comprising a field effect transistor configured to perform impedance conversion on the first electric signals and/or the second electric signals received from the vibratable film and output the converted first electric signals and/or the converted second electric signals as output signals.

12. A detection device comprising:

the detection sensor according to claim 11;

a low-pass filter configured to receive the output signals from the field effect transistor, to pass signals within a frequency band obtained by impedance converting the first electric signals out of the received output signals, and to attenuate signals in a frequency band higher than the frequency band of the signals capable of passing through the low-pass filter;

a high-pass filter configured to pass signals in a frequency band out of the output signals, the frequency band being higher than the frequency band of the signals capable of passing through the low-pass filter, and to attenuate signals in a frequency band lower than the frequency band of the signals capable of passing through the high-pass filter; and a controller configured to receive the signals that have passed through the low-pass filter and to receive the signals that have passed through the high-pass filter, individually, and to determine whether or not the controller has received signals only from the low-pass filter.

13. The detection device according to claim 12, wherein the controller is further configured such that if the controller determines that the controller has received signals only from the low-pass filter, then the controller performs signal processing on the output signals from the field effect transistor.

14. The detection device according to claim 12, wherein the controller is further configured such that if the controller determines that the controller has received signals only from the low-pass filter, then the controller performs signal processing on the signals that have passed through the low-pass filter and the signals that have passed through the high-pass filter.

* * * * *